Nov. 4, 1952        H. B. FUGE        2,617,051
CLUTCH BRAKE MOTOR
Filed Feb. 14, 1951        2 SHEETS—SHEET 2
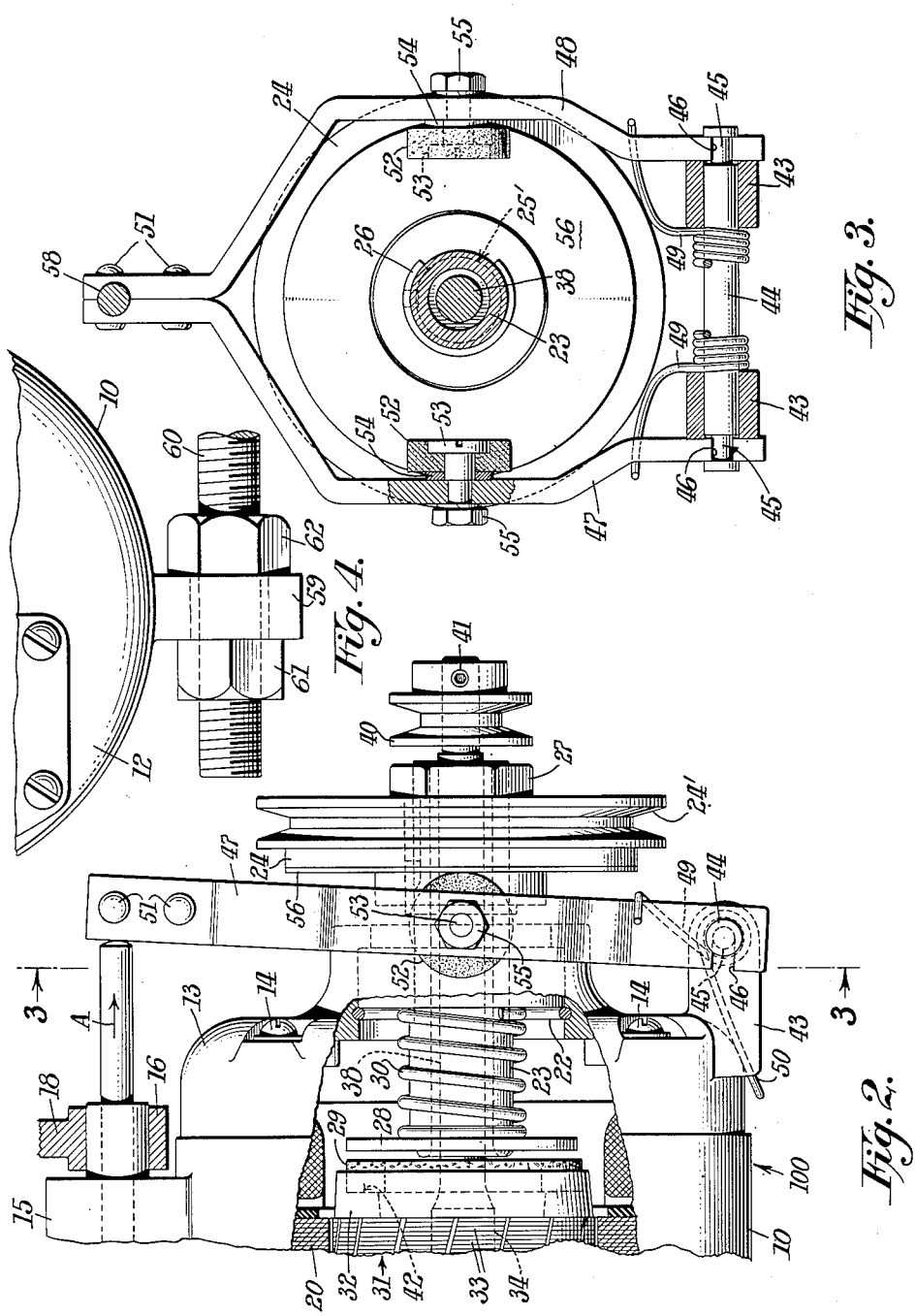
Inventor
Harry B. Fuge
By
William P. Stewart
Attorney
Witness:
Godfrey Pecina Patented Nov. 4, 1952

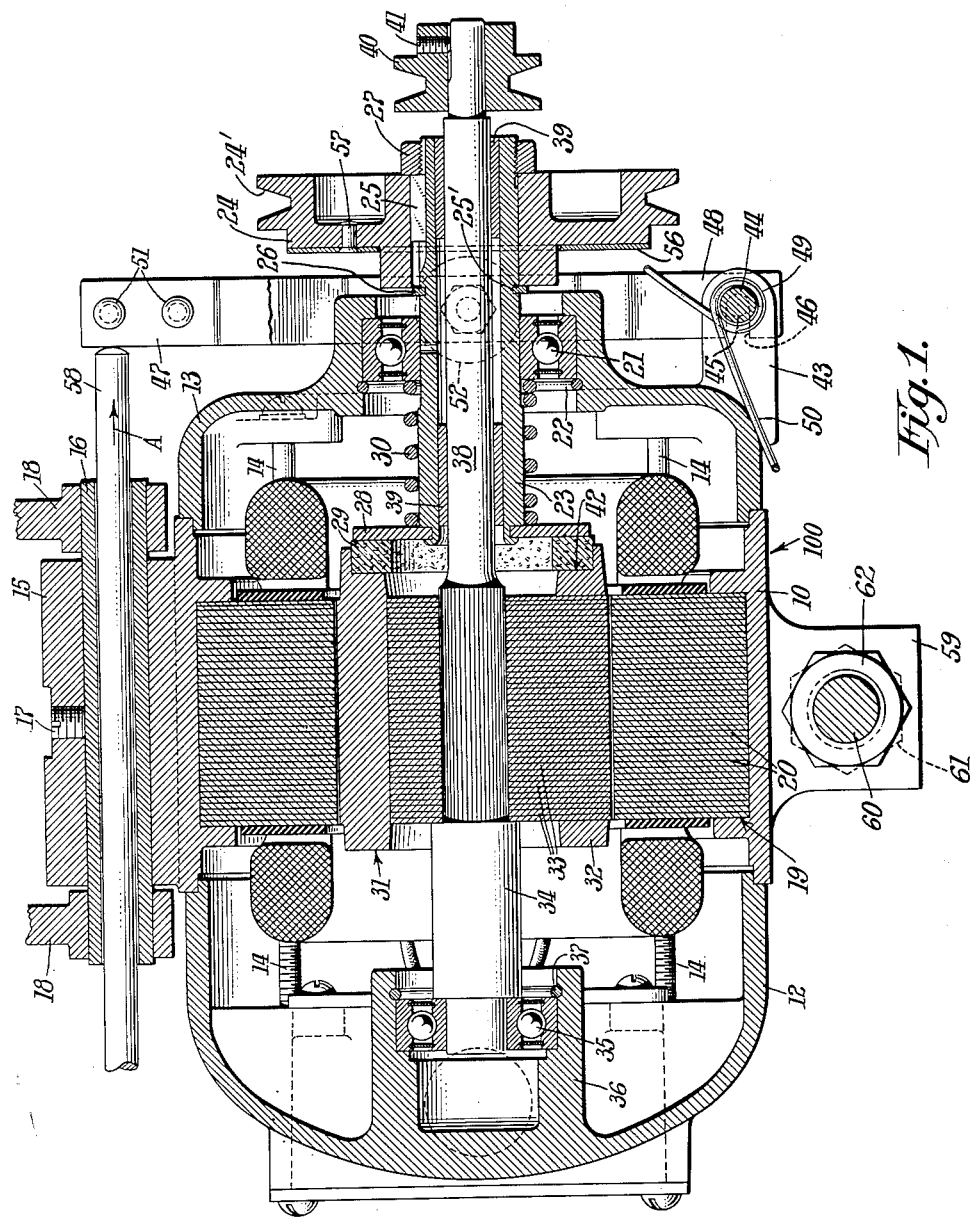

2,617,051

UNITED STATES PATENT OFFICE 2,617,051

CLUTCH BRAKE MOTOR

Harry B. Fuge, Somerville, N. J., assignor to The Singer Manufacturing Company, Elizabeth, N. J., a corporation of New Jersey Application February 14, 1951, Serial No. 210,955

7 Claims. (Cl. 310—76)

This application relates to an electric motor provided with clutch-brake mechanism and used to drive winding machines and the like which are required to start and stop quickly, and it is one of the objects of this invention to produce an improved electric power transmitter which is rugged, small and can be readily attached to and detached from its associated mechanism for the purpose of inspection and repair.

An object of this invention is to provide a clutch and brake having an operator which does not require adjustment each time the tension on the driven belt is adjusted.

Another object of this invention is to provide a quick acting clutch and brake for a normally rotating shaft.

A further object of the invention is to provide an electric transmitter having an improved pivotal mounting.

With the above and other objects in view, the invention comprises the devices, combinations and arrangements of parts hereinafter set forth and illustrated in the accompanying drawings of a preferred embodiment of the invention from which the several features of the invention and the advantages attained thereby will be readily understood by those skilled in the art. Other features of my device which form no part of this application are further described and claimed in my copending U. S. application Serial No. 306,641, dated August 27, 1952, entitled Multiple Drive Clutch-Brake Motors, which is a division of this application.

In the accompanying drawings:

Fig. 1 is a longitudinal vertical sectional view taken substantially through the center of an electric clutch-brake motor embodying the invention.

Fig. 2 is a fragmentary view in side elevation and partly in section of the transmitter clutch and brake structure with the brake engaged.

Fig. 3 is a sectional view taken on line 3—3 of Fig. 2.

Fig. 4 is a fragmentary view of the clutch-brake motor positioning means.

In the preferred embodiment of the invention, the clutch-brake motor is formed with a frame generally indicated as 100, and comprising a hollow cylindrical section 10 having end bells 12, 13 attached thereto by means of screws 14. The frame section 10 is formed with a boss 15 on one side. A tubular journal rod or fulcrum pin 16 is inserted in a hole bored through the boss 15 parallel to the axis of the frame and held in place by a set screw 17. The journal rod 16 is longer than the boss 15 and extends an equal distance at either end of boss 15 into bearing blocks 18 which are fastened to a table or other mounting surface, not shown. Carried by the interior of the frame section 10 is the stator 19 of the transmitter comprising a stack of laminations 20 firmly held together.

An anti-friction bearing 21 is fastened in a recess in the end bell 13 by a snap-ring 22. A tubular shaft 23 is journaled in the bearing 21 and has a brake or pulley member 24 fastened to its outer end with a pulley groove 24' formed in its circumference. The brake member 24 is fastened to the shaft 23 for unitary rotation therewith by means of a key 25. To lock the brake member 24 against lateral movement on the shaft 23 a snap-ring 26 is fitted in a groove 25' in the shaft and the brake member 24 is drawn against the face of the snap-ring by means of a nut 27 threaded on the end of the shaft 23. The driven element of the clutch is in the form of a disc 28 which is fastened to the inner end of shaft 23. A coil compression spring 30 surrounds shaft 23 and has one end which bears against the bearing 21 while the other end bears against the disc 28.

The motor rotor 31 comprises a core 32 and laminations 33 fastened to the shaft 34. The shaft 34 is press fitted into the inner race of an anti-friction bearing 35 mounted in a recess in an internal boss 36 of the end bell 12. The bearing 35 is held in place in the boss 36 by means of a snap spring ring 37. The reduced portion 38 of the shaft 34 is journaled in bushings 39 fitted in the bore of tubular shaft 23. A driven pulley 40 is fastened to the outer end of the motor shaft 34 by means of a set screw 41. The end ring of the rotor core 32 is recessed, as shown at 42, to provide a socket in which a ring of friction material 29 is fastened; the ring 29 acting as the driving element of the clutch.

Two ears 43 are formed on and project axially from the end bell 13 and are provided with holes at their outer ends to receive a pivot pin 44. As shown in Fig. 3, the pivot pin 44 has a reduced diameter 45 near either end, each of which enters a slot 46 cut in the ends of lever arms 47 and 48. A spring 49 is coiled around the pin 44 with one end hooked around the lever arm 47 and the other end hooked around the lever arm 48. A center loop of the spring 49 is drawn back under the motor end bell 13, as shown at 50. The lever arms 47 and 48 are joined together at their free ends, as by rivets 51, to form a unitary lever structure. From the foregoing description, it will be apparent that the pivot pin 44 cannot be removed from the assembled position without first unhooking the spring 49 and removing the lever arms 47 and 48.

A friction disc 52, made of cork or similar material, is attached to the lever arm 47 approximately at its mid-point by means of a stud 53 which passes through the disc 52, a spacing washer 54, the lever arm 47 and is threaded into a nut 55. A second friction disc 52 is attached to the lever arm 48 in a similar manner. Both discs 52 are arranged so that they may be engaged with a friction facing 56 attached to the brake disc 24, as by the rivets 57, and so that their axes are substantially perpendicular to the driven shaft axis.

An endwise shiftable clutch controlling or operating rod 58 extends through the central bore of the tubular journal rod 16 and engages the ends of the lever arms 47 and 48 where they are joined by the rivets 51. The rod 58 may be pushed in the direction of arrow A in Fig. 1 by any well known force applying means, not shown, and returned to its normal position by the action of the spring 49 on the lever arms 47 and 48.

The motor frame section 10 is provided with a motor position adjuster comprising an ear 59 projecting radially outwardly from the frame and formed with a hole as shown in Fig. 1. A supporting bolt 60 fastened to the supporting table or surface (not shown) passes through the hole in the ear 59 and is threaded into adjusting nuts 61 and 62 which are disposed on opposite sides of the ear 59. This arrangement permits the position of the motor to be varied about its pivotal support so that the tension on the belts (not shown) passing over pulleys 24 and 40 may readily be adjusted.

In the operation of the device, the rotor shaft 34 and therefore the pulley 40 rotate continuously whenever the motor is operating. When no operating force is applied to shift the rod 58 in the direction of arrow A, the spring 30 yieldingly urges the disc 28 and the shaft 23 to the left so that the driving clutch engaging face of the ring 29 and the driven disc 28 are spring pressed into engagement with each other. Under these conditions, the pulleys 24 and 40 are both driven by the motor armature. At certain times, it is advantageous to stop the pulley 24 quickly without interfering with the operation of the pulley 40. This may be accomplished by applying a force to the operating rod 58 so as to move the rod in the direction of the arrow A. When the rod 58 is moved in this direction, it will cause the lever arms 47 and 48 to swing in a clockwise direction, as viewed in Fig. 1, about the pivot pin 44 and in opposition to the spring 49. This movement of the lever arms will carry the braking friction discs 52 toward the friction brake facing 56 which is attached to the brake member 24. Further movement of the control rod 58 in the direction of arrow A causes the friction discs 52 to engage the brake facing 56 and force the brake member 24, shaft 23 and disc 28 in the direction of arrow A and against the action of the spring 30 to disengage the clutch and simultaneously apply a braking action to the driven element of the clutch, the tubular shaft 23 and the brake member 24. Upon release of the operating force from the rod 58, the spring 49 will return the lever arms 47 and 48 and the rod 58 to the initial position shown in Fig. 1. This will release the friction discs from engagement with the facing 56 and allow the compression spring 30 to yieldingly urge the disc 28, shaft 23 and brake member 24 in a direction opposite to arrow A to again engage the driven element 28 of the clutch with the friction ring 29. There is no period between the time when the clutch is disengaged and the time when the brake is engaged when the brake disc 24 runs free, thus braking and de-clutching occur simultaneously. Further, the brake is never disengaged before the clutch is engaged upon re-engaging the driving and driven elements of the clutch and, therefore, the member 24 is held stationary until the moment driving contact between the clutch elements is established. This construction provides an accurate and positive control over the operation of pulley 24, without disturbing the constant speed operation of pulley 40.

As may be readily seen, this unit eliminates the necessity of adjusting the clutch and brake operating device each time the belt tension is adjusted. With prior types of clutch and brake operators, such as the operator shown in the patent issued to Peets et al., No. 2,274,457, in order to retain the same clutch and brake adjustment, the clutch and brake operator must be adjusted each time the belt tension is adjusted due to the change in the angular position of the entire transmitter. Further, in prior devices, the driven pulley runs free for an interval of time between the disengagement of the brake and the engagement of the clutch. This does not provide positive control for the driven pulley.

When the herein described clutch-brake driving mechanism is used and it is necessary to adjust the belt tension, the position of the nut 61 and lock nut 62 on the bolt 60 is changed. This will change the angular position of the entire transmitter about the axis of the journal sleeve 16 and thus alter the belt tension. However, since the axis of the operating rod 58 is coincident with the axis about which the transmitter is pivoted, there is no change in the operative relation of the parts of the clutch and brake operator. The clutch and brake will operate with the same timing that they previously operated without any adjustment being necessary. It should also be noted that as the friction disc 52 wears, the friction ring 29 also wears. The wear of one compensates for the wear of the other, so that, once adjusted, the axial position of the face 56 with respect to the discs 52, will always be correct.

From the foregoing description, it will be apparent that the construction described is susceptible of variations and that changes may be made therein without departing from the spirit of my invention or the scope of the appended claims.

Having thus set forth the nature of the invention, what I claim herein is:

1. An electric clutch-brake motor having a frame, a stator carried by said frame, a rotor carried by said frame and having an axis of rotation, a pivotal mounting for said frame having its fulcrum axis spaced from said rotor axis, a bearing carried by said frame, a driven element rotatably journaled in said bearing and operatively connected to said rotor for rotation therewith, mechanism for disconnecting said driven element from said rotor, and a control member operatively connected with said mechanism and having a major axis disposed coincident with said fulcrum axis.

2. An electric clutch-brake motor having a frame, a stator carried by said frame, a rotor carried by said frame and having an axis of rotation, a pivotal mounting for said frame having its fulcrum axis parallel to and spaced from said rotor axis, a bearing carried by said frame, a driven element journaled in said bearing and rotatable with respect to said frame, means operatively connecting said rotor to said driven element for rotation, mechanism for rendering said connecting means inoperative, and a control member operatively connected with said mechanism and having a major axis disposed coincident with said fulcrum axis.

3. An electric clutch-brake motor having a frame, a stator carried by said frame, a rotor carried by said frame and having an axis of rotation, a driving clutch element actuated by said rotor, a pivotal mounting for said frame having a fulcrum axis spaced from said rotor axis, a bearing carried by said frame, a driven clutch element journaled in said bearing and rotatable with respect to said frame, mechanism for moving said driven clutch element into engagement with said driving clutch element, and a control member operatively connected with said mechanism and having a major axis disposed coincident with said fulcrum axis, whereby said transmitter may be adjusted about its pivotal axis without disturbing the relationship between said control member and said mechanism.

4. An electric clutch-brake motor having a frame, a stator carried by said frame, a rotor carried by said frame and having an axis of rotation, a pivotal mounting for said frame having its fulcrum axis spaced from the said rotor axis, a bearing carried by said frame, a driven element journaled in said bearing and rotatable with respect to said frame, a clutch operatively connecting said rotor to said driven element, mechanism for rendering said clutch inoperative, and a control device operatively connected to said mechanism and comprising an operating member having a major axis coincident with the fulcrum axis of said pivotal mounting.

5. An electric clutch-brake motor having a frame, a stator carried by said frame, a rotor carried by said frame and having an axis of rotation, a pivotal mounting for said frame having a hollow fulcrum pin spaced from and parallel to said rotor axis, a bearing carried by said frame, a transmitter position adjuster fastened to said frame, a driven element rotatably journaled in said bearing, means operatively connecting said rotor to said driven element for rotation, mechanism for rendering said connecting means inoperative, and a control member passing through said hollow fulcrum pin and operatively connected to said mechanism.

6. An electric clutch-brake motor having a frame, a stator carried by said frame, a rotor carried by said frame and having an axis of rotation, a pivotal mounting for said frame having a fulcrum axis spaced from the said rotor axis, a bearing carried by said frame, a driven element journaled in said bearing and rotatable with respect to said frame, means operatively connecting said rotor to said driven element for rotation, a lever pivotally fastened to said frame and carrying a brake to retard said driving element, and a control member having a major axis disposed coincident with said fulcrum axis and operatively connected to said lever to operate said brake.

7. An electric clutch-brake motor having a frame, a stator carried by said frame, a rotor carried by said frame and having an axis of rotation, a projection on said frame, a support for said motor, a tubular journal rod passing through said projection and pivoted in said support, a driven element rotatable with respect to said frame, means operatively connecting said rotor to said driven element for rotation, mechanism for rendering said connecting means inoperative, a control member concentric with said tubular journal rod, and an operative connection between said control member and said mechanism.

HARRY B. FUGE.

REFERENCES CITED

The following references are of record in the file of this patent:

UNITED STATES PATENTS

| Number | Name | Date |
|---|---|---|
| 1,663,607 | Naul | Mar. 27, 1928 |
| 2,518,725 | Sauer | Aug. 15, 1950 |